No. 884,250. PATENTED APR. 7, 1908.
C. A. WILCOX.
AX.
APPLICATION FILED JULY 27, 1907.
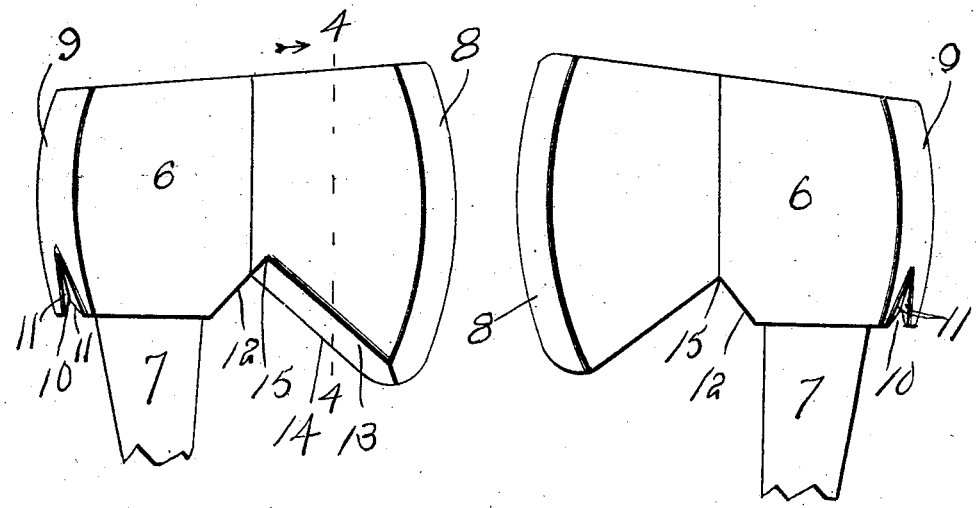
Fig. 1.
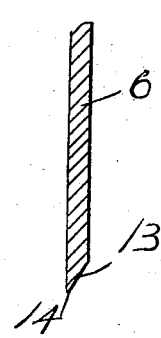
Fig. 2.
Fig. 3.
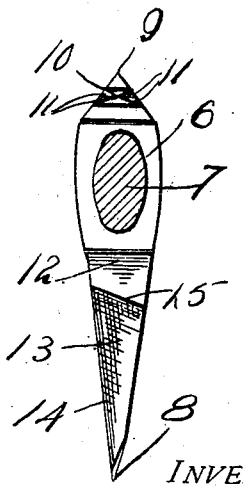
Fig. 4. Fig. 5.
WITNESSES:
J. C. Simpson
F. G. Smith
INVENTOR
Charles A. Wilcox.
BY
Attorneys.

UNITED STATES PATENT OFFICE.

CHARLES A. WILCOX, OF VALLEY, WASHINGTON.

AX.

No. 884,250.  Specification of Letters Patent.  Patented April 7, 1908.

Application filed July 27, 1907. Serial No. 385,868.

*To all whom it may concern:*

Be it known that I, CHARLES A. WILCOX, a citizen of the United States, residing at Valley, in the county of Stevens, State of Washington, have invented certain new and useful Improvements in Axes; and I do hereby declare the following to be a full, clear, and exact description of the invention, such as will enable others skilled in the art to which it appertains to make and use the same.

This invention relates to axes and more specifically to an ax which is particularly well adapted for use by woodmen.

In carrying out my invention I have provided an ax head having the usual cutting edge, a cutting edge upon its back and having its rear edge sharpened to form a cutting edge for the purpose of cutting underbrush.

The specific novelty of my invention resides in the formation and location of this last-mentioned cutting edge of the ax head, so that it will be thoroughly efficient in its operation.

In the accompanying drawings, Figure 1 is a side elevation of an ax constructed in accordance with the present invention, a portion of the handle being shown, Fig. 2 is a similar view of the opposite side of the ax, Fig. 3 is a top plan view of the ax, Fig. 4 is a vertical sectional view on the line 4—4, of Fig. 1, and, Fig. 5 is a rear edge view of the ax.

As shown in the drawings the ax comprises a head 6 and a handle 7, the head having the usual cutting edge 8 and having its back sharpened to form a cutting edge 9 and provided with a kerf 10 the walls of which are oppositely beveled as at 11, the kerf being used in stretching fence wire by engaging the wire in the kerf and using the ax as a lever. This kerf is formed in the rear edge of the ax head at the sharpened portion 9 thereof, this portion being of course located above the ax handle 7. That portion of the rear edge of the ax head below the ax handle 7 is cut inwardly as at 12 at an angle to the ax handle 7 and the remainder of the rear edge is extended rearwardly and downwardly substantially at right angles to its portion 12 as indicated at 13. One face, preferably the right hand face of the ax head is beveled along the portion 13 of the rear edge of the head as at 14 and the resultant edge is sharpened to form a cutting edge. It will be understood that the portion 12 of the rear edge of the ax head is abrupt or unsharpened and by reason of the fact that the portions 12 and 13 of the rear edge of the ax head are directed at right angles with respect to each other a kerf or hook 15 results at the junction of the two portions of the said edge. It will be understood also that a keener cutting edge is secured by beveling only one face of the ax head along the portion 13 of the rear edge thereof and that in use the said head may be hooked beneath the underbrush and the underbrush lifted by reason of its engagement in the kerf 15 and readily cut by the cutting edge 14. I have found that a better result can be obtained by forming the portion 13 of the rear edge of the head of greater length than the portion 12 thereof in the first place for the reason that the opposing side of the ax handle adds to the capacity of the kerf. Furthermore it will be seen from the above disclosure of the invention and from the drawings that the cutting edge 14 of the head is directed at an angle from the plane of the ax handle but in an opposite direction from the portion 12 of the rear edge of the head. All of these features go to produce a more efficient device and I have found that within the scope of the experiments I have made no other arrangement produces so desirable a construction.

What is claimed, is—

An ax comprising a handle and a head, the rear edge of the head below the plane of the handle being cut inwardly toward the forward edge thereof, the adjacent portion of the edge being abrupt and unsharpened and extended at an angle forwardly from the handle, the remainder of the said edge being sharpened by beveling one face of the head along the said edge, the latter portion of the rear edge of the head being extended rearwardly substantially at right angles from the abrupt portion of the edge and being of greater length than the said abrupt portion and disposed at an angle with respect to the handle but being extended in a direction opposite to the direction of extension of the unsharpened portion substantially as described and for the purpose set forth.

In testimony whereof, I affix my signature, in presence of two witnesses.

CHAS. A. WILCOX.

Witnesses:
  CARL C. MOORE,
  L. E. LADD.